(12) United States Patent
Ashfield et al.

(10) Patent No.: US 8,295,898 B2
(45) Date of Patent: Oct. 23, 2012

(54) LOCATION BASED AUTHENTICATION OF MOBILE DEVICE TRANSACTIONS

(75) Inventors: James Ashfield, Charlotte, NC (US); David Shroyer, Charlotte, NC (US); Douglas Brown, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 626 days.

(21) Appl. No.: 12/177,513

(22) Filed: Jul. 22, 2008

(65) Prior Publication Data

US 2010/0022254 A1 Jan. 28, 2010

(51) Int. Cl.
*H04M 1/00* (2009.01)
*H04W 24/00* (2009.01)
(52) U.S. Cl. ................... 455/575.6; 455/456.1
(58) Field of Classification Search .... 455/456.1–456.6, 455/575.1–575.6; 370/338, 328, 329
See application file for complete search history.

(56) References Cited

U.S. PATENT DOCUMENTS

| | | | |
|---|---|---|---|
| 7,321,775 B2 * | 1/2008 | Maanoja | 455/456.1 |
| 7,751,829 B2 * | 7/2010 | Masuoka et al. | 455/456.1 |
| 2003/0190921 A1 * | 10/2003 | Stewart | 455/456.3 |
| 2006/0194592 A1 * | 8/2006 | Clough | 455/456.3 |
| 2007/0133487 A1 * | 6/2007 | Wang et al. | 370/338 |
| 2007/0136573 A1 | 6/2007 | Steinberg | |
| 2009/0276321 A1 * | 11/2009 | Krikorian et al. | 705/17 |

OTHER PUBLICATIONS

Terry Sweeney; SIS Taps Mobiles to Reduce Credit Fraud; Mar. 5, 2008 05:09 PM; paragraphs 1 2 and 3.*
"Security System Matches Card Purchase to Cellphone Location", ePaynews, the Payment News and Resource Center, <http://www.epaynews.com/index.cgi?survey=false&keywords=&optional=&subject=Banking%20>, first date of publication prior to May 13, 2008, 4 pages.
Sweeney, "SIS Taps Mobiles to Reduce Credit Fraud", <http://www.informationweek.com/security/showArticle.jhtml; jsessionid=5E1NB1B3KB1JYQSNDLRSKH0CJUNN2JVN?articleID=206901958), Mar. 5, 2008, 2 pages.
mConfirm—Fraud Management Solutions for Credit Card Issuers, <http://www.mconfirm.com/>, first date of publication prior to May 13, 2008, 9 pages.
International Search Report and Written Opinion for PCT/US2009/051121, mailed Aug. 26, 2009.

* cited by examiner

*Primary Examiner* — Michael Faragalla
(74) *Attorney, Agent, or Firm* — Banner & Witcoff, Ltd; Michael A. Springs

(57) ABSTRACT

Systems, methods, and software for implementing location-based authentication of both online and mobile web-based transactions. This implementation may involve verifying whether a mobile device (such as a cellular telephone) is proximate to a computer from which the transaction is being performed. Depending upon the location of the mobile device, further transactions may be approved or rejected. In further implementations, the transactions may be made from the mobile device itself. In this case, the location of the mobile device compared with one or more pre-stored locations may affect whether further transactions from the mobile device are approved or rejected.

19 Claims, 4 Drawing Sheets

LOCATION BASED AUTHENTICATION OF MOBILE DEVICE TRANSACTIONS

BACKGROUND

Most banking and other transactions require some type of authentication to ensure that the person invoking the transaction has authorization to do so. Put another way, this authentication is used to confirm that the person is who he says he is. There are generally three types of authentication: something you know, something you have, and something you are. The "something you know" type of authentication may include, for instance, a user identification ("userid") and a password. The "something you have" type of authentication may include, for instance, a key, a machine-readable card, or a time-changing passcode-generating device. The "something you are" type of authentication may include, for instance, a biometric measurement (e.g., fingerprint), a comparison of how you look to a photographic identification card, or your signature.

While these are tried-and-true types of authentication, they are not always convenient to the person invoking the transaction. For example, the person may not easily remember a password, or may forget to carry the "something you have" object. And, the "something you are" type of authentication is often not convenient to implement in a remote transaction (e.g., an Internet website-based banking transaction).

It would be desirable to either provide an alternative to at least one of the authentication techniques currently used, or to provide an additional layer of authentication to those currently used.

SUMMARY

Aspects of the invention as described herein include providing a system, method, and software for implementing location-based authentication of an electronic transaction. The transaction may be, for example, a financial transaction on a bank's or other financial institution's online website. This implementation may involve verifying whether a mobile device (such as a cellular telephone) is proximate to a computer from which the transaction is being performed. If the mobile device is not sufficiently proximate, then the transaction may be rejected. If the mobile device is sufficiently proximate, then the transaction may be approved. Rather than outright approval or rejection of the online transaction based on mobile device proximity, the proximity of the mobile device may be simply one factor in determining an authentication risk score that is adjusted to reflect a higher or lower risk that the customer presents. The authentication risk score may then be used to determine whether a particular online transaction should be approved or rejected.

This location-based authentication may be performed at any time relative to the online transaction. For example, the location-based authentication may be performed during user login, during initiation of the online transaction, and/or at the end of an online transaction such as just prior to final submission or confirmation of the transaction.

In further aspects, location-based authentication may be performed in connection with electronic transactions, such as financial transactions, implemented from the mobile device itself on a website received by the mobile device (mobile website). The location of the mobile device may be determined and compared with one or more pre-stored locations. Depending upon the comparison, the authentication risk score may reflect a higher or lower risk. As in the previous aspects, the authentication risk score may then be used to determine whether a particular mobile transaction should be approved or rejected. Or, the comparison may be used directly to approve or reject a mobile transaction and/or affect whether further access to the mobile website is allowed.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
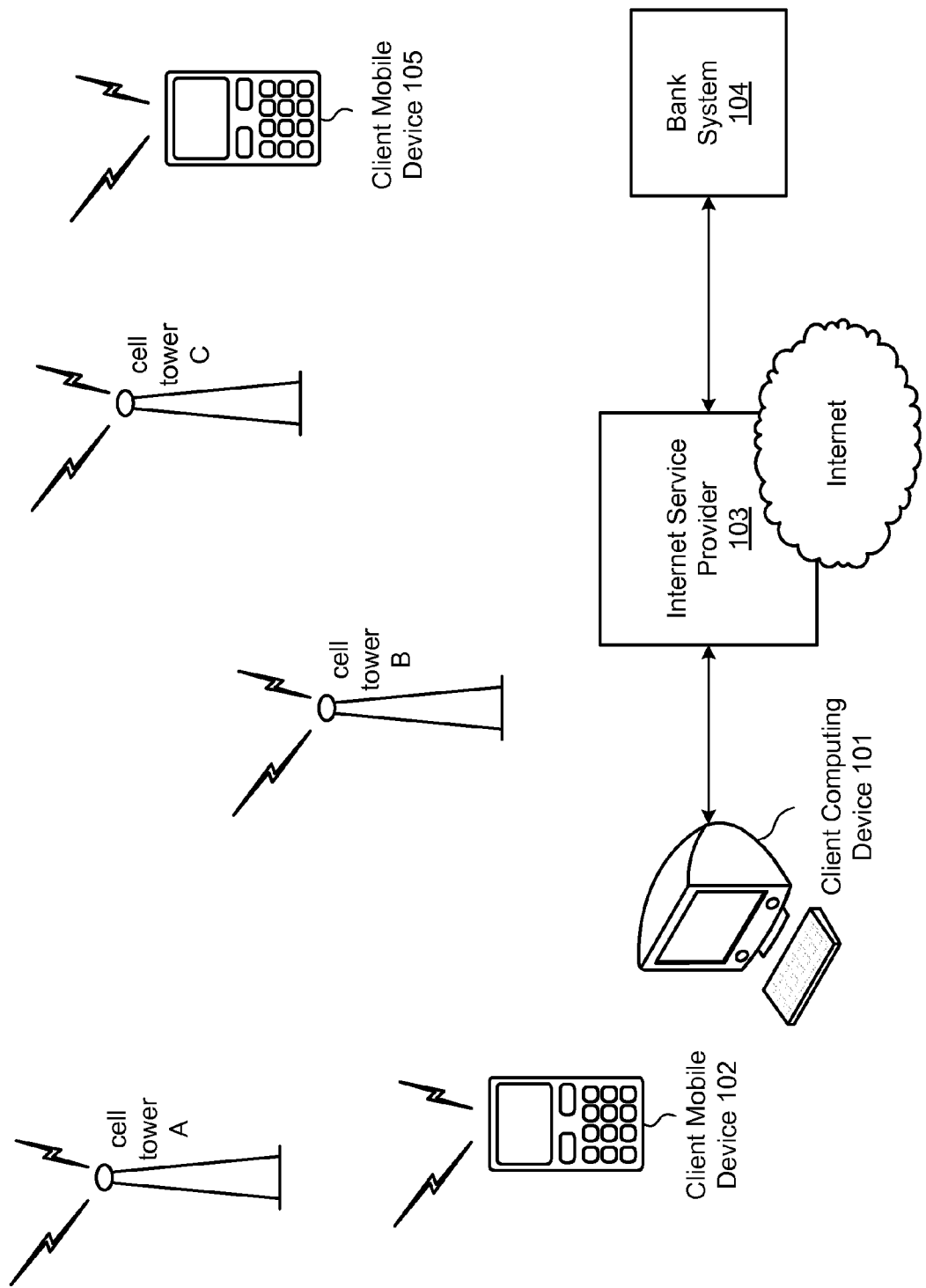
FIG. 1 is a functional block diagram of an illustrative online transaction environment.

FIG. 1 is a functional block diagram of an illustrative online transaction environment. The environment in this example includes a client computing device 101, one or more client mobile devices 102, 105, an internet service provider 103, a bank system 104, and a cellular telephone network including a plurality of cell towers A, B, C. In this example, client computing device 101 and bank system 104 are communicatively coupled to internet service provider 103, which in turn provides Internet connectivity to client computing device 101 and bank system 104. Although only one internet service provider is shown, client computing device 101 and bank system 104 may each be coupled to different internet service providers. Also, although communication via the Internet is discussed in the following examples, any other network may be used in addition to the Internet or as an alternative to the Internet, such as those that utilize Internet Protocol (IP). In further examples, client computing device 101 may be communicatively coupled to bank system 104 via means other than the Internet. For instance, client computing device 101 may communicate with bank system 104 via a private satellite link or via a cellular or landline telephone line.

Client mobile devices 102, 105 may be any portable device having wireless communications capabilities. For example, client mobile devices 102, 105 may be or include a cellular telephone and/or a pager. Client mobile devices 102, 105 may further include other features such as a personal digital assistant (PDA) and a computer.

Client computing device 101 may be any type of computing device. A "computing device," as referred to herein, includes any electronic, electro-optical, and/or mechanical device, or system of physically separate devices, that is able to process and manipulate information, such as in the form of data. Non-limiting examples of a computing device includes one or more personal computers (e.g., desktop or laptop), personal digital assistants (PDAs), cellular telephones, servers, and/or a system of these in any combination. In addition, a given computing device may be physically located completely in one location or may be distributed amongst a plurality of locations (i.e., may implement distributive computing). A computing device may even be a mobile device.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

As stated previously, client computing device 101 may be any type of computing device. Some non-limiting examples are a laptop computer, a handheld computer, a desktop computer, or an automated teller machine (ATM). ATMs are well-known computing devices that have the additional capability of storing, receiving and dispensing cash during a financial transaction with a bank customer. In addition, client computing device 101 may be in a fixed location or it may be mobile. Where mobile, client computing device 101 may have a self-positioning capability, such as using global positioning system (GPS) technology. This self-positioning capability may allow client computing device 101 to determine its own position and may allow client computing device 101 to communicate data indicating the determined position to bank system 104. An example of this is a mobile ATM having GPS self-locating capability.

Bank system 104 and internet service provider 103 may each include one or more computing devices for performing the functions attributed to them as described herein. Further illustrative details regarding bank system 104 will be discussed below.

In operation, client computing device 101 and bank system 104 may engage in a web page session, the web page being generated by bank system 104. The web page may be, for instance, a web page that allows a user of client computing device 101 to log in to the web page (such as using a user ID and a password) and access certain financial accounts for which the user is authorized to gain access. The user may perform certain financial transactions on those accounts, such as but not limited to making payments from those accounts and transferring funds between accounts. The financial accounts may be banking accounts (e.g., checking accounts, savings accounts, money market accounts, certificate of deposit accounts, investment accounts, loans or lines of credit, and the like) or accounts of other financial institutions.

At some point during the internet web page session, such as during login or during a financial transaction request, bank system 104 may determine whether the login or financial transaction request should be approved or rejected, based on the location of at least one of the mobile devices associated with the user of client computing device 101. For instance, client mobile devices 102 and 105 may both be associated with that user. To do so, bank system 104 may determine the location of both client computing device 101 and of client mobile device 102 and/or 105.

To determine the location of client computing device 101, bank system 104 may determine the IP address of client computing device 101 and cross reference the IP address to a database of one or more IP addresses each mapped to a geographical location. For example, a first IP address may be associated with a first city, while a second different IP address may be associated with a second different city. This process is well known and is commonly referred to as IP geolocation. There are many service providers today that offer IP geolocation services. Thus, bank system 104 may have access to such an IP geolocation service. Alternatively, bank system 104 may provide its own homegrown IP geolocation service. Also, as an alternative to bank system 104 determining the location of client computing device 101, bank system 104 may receive the self-positioning data from client computing device 101, where client computing device 101 has such a capability.

To determine the location of a client mobile device, such as client mobile device 102, any of various known techniques may be used. For example, a client mobile device may include self-locating capabilities, such as using global positioning system (GPS) and/or dead-reckoning technology. In such a case, client mobile device may simply provide information to bank system 104 about its own location. This may be accomplished, for instance, by executing software stored on a computer-readable medium of the client mobile device that causes the client mobile device to sent its location to bank system 104 in response to a request from bank system 104. This software may even be uploaded to the client mobile device by bank system 104, with the owner's permission.

Another way to determine the location of a client mobile device is to measure the signal strength of a wireless signal emanating from the client mobile device. As mentioned previously, a client mobile device has wireless communication capabilities. These wireless communications may be with one or more of cell towers A, B, C. Which towers are able to communicate with the client mobile device at any given time depends upon the location of the client mobile device. Moreover, the wireless signal strength from the client mobile device as received by any particular cell tower will also depend upon (among other factors) the distance between the client mobile device and that cell tower. Thus, by measuring the signal strength of a client mobile device from one or more of the cell towers, the location of the client mobile device may be determined. The accuracy of the determination depends in part upon how many cell towers are able to read the wireless signal emanating from the client mobile device. For example, using such a technique, the location of the client mobile device may be determined to the granularity of a city block, or less accurately such as to the granularity of an entire city or county. The term "triangulation" is often used for this technique where more than one cell tower is used simultaneously to measure the wireless signal strength.

It is becoming more common for client mobile devices to include a dual wireless communications system. For instance, many cellular telephones now include not only wireless communication capability with standard cell towers, but also wireless communication capability with wireless local area networks (WLANs) such as IEEE 802.11 standard wireless networks. Thus, if the client mobile device is connected to a particular WLAN, and if the location of that WLAN is known, then the location of the client mobile device may also be determined based on which WLAN it is connected to, such as via internet service provider 103. This is therefore a variation on the above-described IP geolocation technique.

Despite the technology used to locate a client mobile device, if at least one of client mobile devices (e.g., mobile devices 102 and 105) associated with client computing device 101 and/or the logged-in user of client computing device 101 is determined to be proximate to client computing device 101, then an online transaction from client computing device 101 may be approved. However, if all of the associated client mobile devices are not proximate, then the online transaction may be rejected. Rather than outright approval or rejection of the online transaction based on mobile device proximity, the proximity of the mobile device(s) may be simply one factor in determining a risk score. The risk score may then be used to determine whether a particular online transaction should be approved or rejected To determine which mobile devices are relevant for proximity determination, a computer-readable medium, which may be organized as a relational database, may store data representing a plurality of users (e.g., bank customers) and their associated client mobile devices. For instance, customer A may have client mobile device 102, and customer B may have client mobile device 105. Or, customer A may have both client mobile devices 102 and 105, and customer B may have one or more other client mobile devices not shown in FIG. 1. In this way, when a particular customer logs on to a client computing device (such as device 101), bank system 104 may, in no particular order: (a) determine the location of the logged-in client computing device such as through IP geolocation techniques, (b) determine the identity of the logged-in customer from data sent by the client computing device, (c) determine the location of one or more of that customer's client mobile devices, such as in one of the manners discussed previously, (d) approve or reject an online transaction from the client computing device based on the locations of those one or more client mobile devices, and (e) send an indication to the client computing device of whether the online transaction has been approved or rejected, or some other message in which the message content depends upon the locations of the one or more client mobile devices. Bank system 104 may further compare the locations of the one or more client mobile devices with the location of the client computing device to determine their proximity to the client computing device. Thus, whether the online transaction is approved or rejected may depend, for instance, on the proximity of the one or more client mobile devices to the client computing device.

Whether or not there such proximity exists may depend upon how proximity is defined in the particular implementation. For instance, proximity of a client mobile device to a client computing device may be established the client mobile device is located within a threshold radius of the client computing device. This threshold radius may be of any distance, such as feet, city blocks, miles, and the like. Another possibility is that proximity is established where the client mobile device and the client computing device are in the same jurisdiction, such as in the same city, county, state, or country. The granularity of proximity determination may depend upon the granularity of the determined location of the client computing device and or client mobile device.

Figure 2:
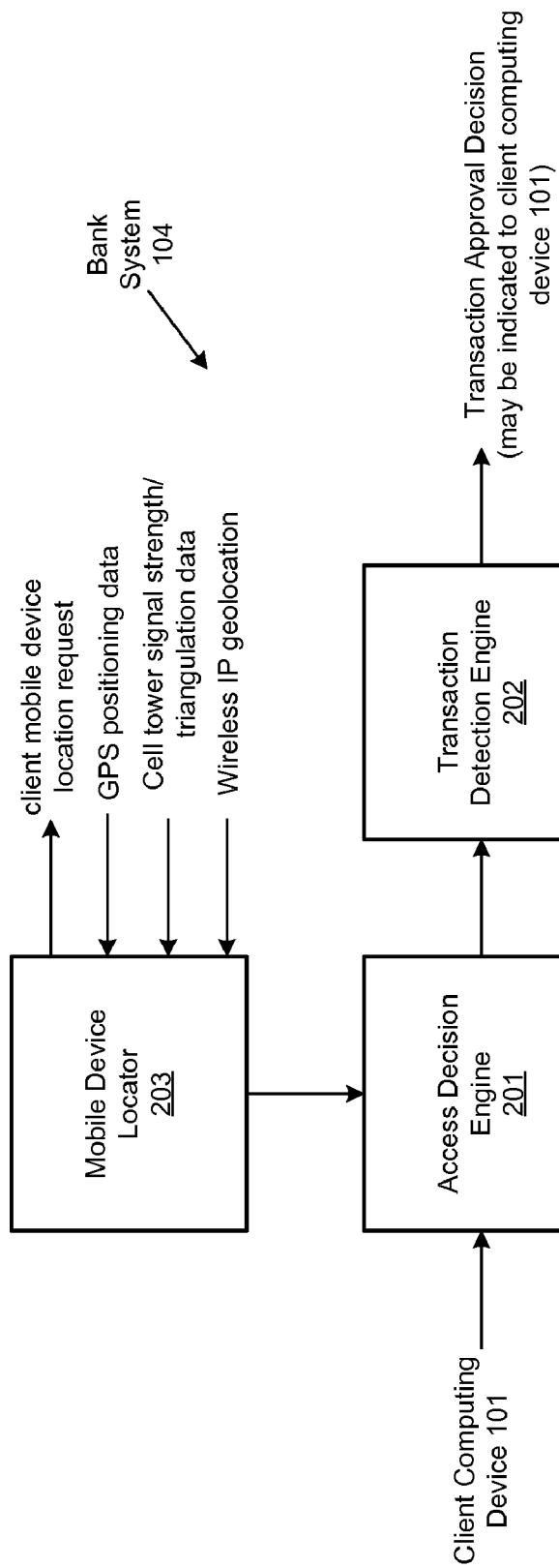
FIG. 2 is a functional block diagram of details of an illustrative bank system that may be part of the environment of FIG. 1.

FIG. 2 is a functional block diagram of illustrative details of bank system 104. In this example, bank system 104 includes an access decision engine 201, a transaction detection engine 202, and a mobile device locator 203. Each of these functional blocks 201-203 may be implemented as a computing device that includes one or more physical devices and/or one or more computer-readable media. Also, as previously generally described, each of the computing devices may in units 201-203 may be implemented by hardware and/or by software stored in computer-readable media and executed by the computing devices. Thus, any of the functions attributed to units 201-203 herein may be performed by those computing devices, using hardware and/or software therein.

Access decision engine 201 is responsible for determining the location of client computing device 101, requesting the location of client mobile devices 102 and/or 105, and determining an authentication risk score based on one or more factors including the proximity of the one or more client mobile devices to client computing device 101.

Transaction detection engine 202 is responsible for determining, on a transaction by transaction basis, whether each transaction should be approved or rejected. These decisions may depend upon one or more factors including the authentication risk score (if previously determined) or even directly on the proximity status of the one or more client mobile devices to client computing device 101.

Mobile device locator 203 is responsible for determining, responsive to a request from access decision engine 201, the location of one or more client mobile devices associated with the logged in customer at client computing device 101. Either transaction detection engine 202 or mobile device locator 203 may also determine the identity of those client mobile devices by consulting the above-described database associating customers with client mobile devices. Mobile device locator 203 may include equipment for actually locating client mobile devices, or it may include one or more communication interfaces for sending requests and in response to those requests receiving data representing the locations of the requested client mobile devices. This data may include, for instance, GPS positioning data, cell tower signal strength/triangulation data, and/or wireless IP geolocation data. The requests may include an identification of the particular client mobile device(s) of interest, such as by telephone number where the client mobile device has a telephone number, or by some other identifier associated with the client mobile device. The requests may be sent to, and the responsive information received from, a system external to bank system 104, such as a cellular telephone network that includes or otherwise communicates with cell towers A, B, and C, and/or internet service provider 103.

The database previously noted that associates customers with client mobile devices may be located anywhere in bank system 104, such as part of any of units 201-203. Also, access decision engine 201 and/or some other portion of bank system 104 may be responsible for generating an online banking website that the customer may log into and conduct online transactions on from client computing device 101.

It should be noted that the divisions between functional blocks in FIG. 2 is merely illustrative, and that the physical division of computing devices and other equipment may be different from the functional division. Moreover, some or all of the functional blocks may be combined or further subdivided functionally and/or physically.

FIG. 1 shows an illustrative process that may be implemented by bank system 104. In step 301, the customer at client computing device 101 provides an online ID to the online banking website generated by bank system 104, such as by access decision engine 201. In step 302, the online banking website (e.g., access decision engine 201) identifies the customer in accordance with the online ID and/or a password. In step 303, access decision engine 201 determines whether the customer is registered for location-based authentication (LBA). In other words, it is determined whether client mobile device proximity should be determined. This may be determined such as by consulting the above-described database. For instance, the database may associate each customer with an indication of whether the customer is registered for LBA.

If the customer is registered for LBA, then in step 304 access decision engine 201 requests mobile device locator 203 to determine the location of one or more client mobile devices associated with the identified customer. Mobile device locator 203 performs this function and returns the location information to access decision engine 201. Simultaneously or after receiving the location information from mobile device locator 203, access decision engine 201 in step 306 determines, or already knows from pre-stored data, the location of client computing device 101, such as by IP geolocation techniques. Also in step 306, access decision engine 201 determines an authentication risk score based on the locations of the client mobile device(s) and/or client computing device 101. For instance, as discussed above, the authentication risk score may depend upon the proximity of the client mobile device(s) to client computing device 101.

If the customer is not registered for LBA, then the location of client computing device 101 is determined such as through IP geolocation, as previously described, and the process then moves to step 306.

In step 307, access decision engine 201 determines whether access to online banking is approved, based on the authentication risk score. If not approved, then the online banking session ends. If approved, then in step 308 access is granted to online banking and to online transaction functionality, and the customer is passed to transaction decision engine 202.

In step 309, the customer performs a financial transaction, such as a transfer of funds from an account at the bank to an account at another bank, or such as a payment to a payee. If the transaction is of a type that is considered sufficiently high risk (such as the to illustrative transactions just mentioned), then in response transaction decision engine 202 may determine whether the requested transaction is approved in step 310 depending upon the authentication risk score previously determined. If the transaction is approved, then in step 311 this may be noted such as by displaying a first message (e.g., "transaction approved") on the website or by otherwise modifying the online banking website in a first way (e.g., by displaying a transaction confirmation or by providing access to another portion of the online banking website). If the transaction in rejected, then in step 312 this may be noted such as by displaying a second different message (e.g., transaction rejected") on the website or by otherwise modifying the online banking website in a different second way (e.g., by displaying a transaction confirmation or by displaying yet another portion of the online banking website). For instance, if the transaction is rejected, the online banking website may direct the customer to further authentication functions (such as by asking certain questions that only the customer should know the answer to, or by requiring some other additional authentication).

Figure 3:
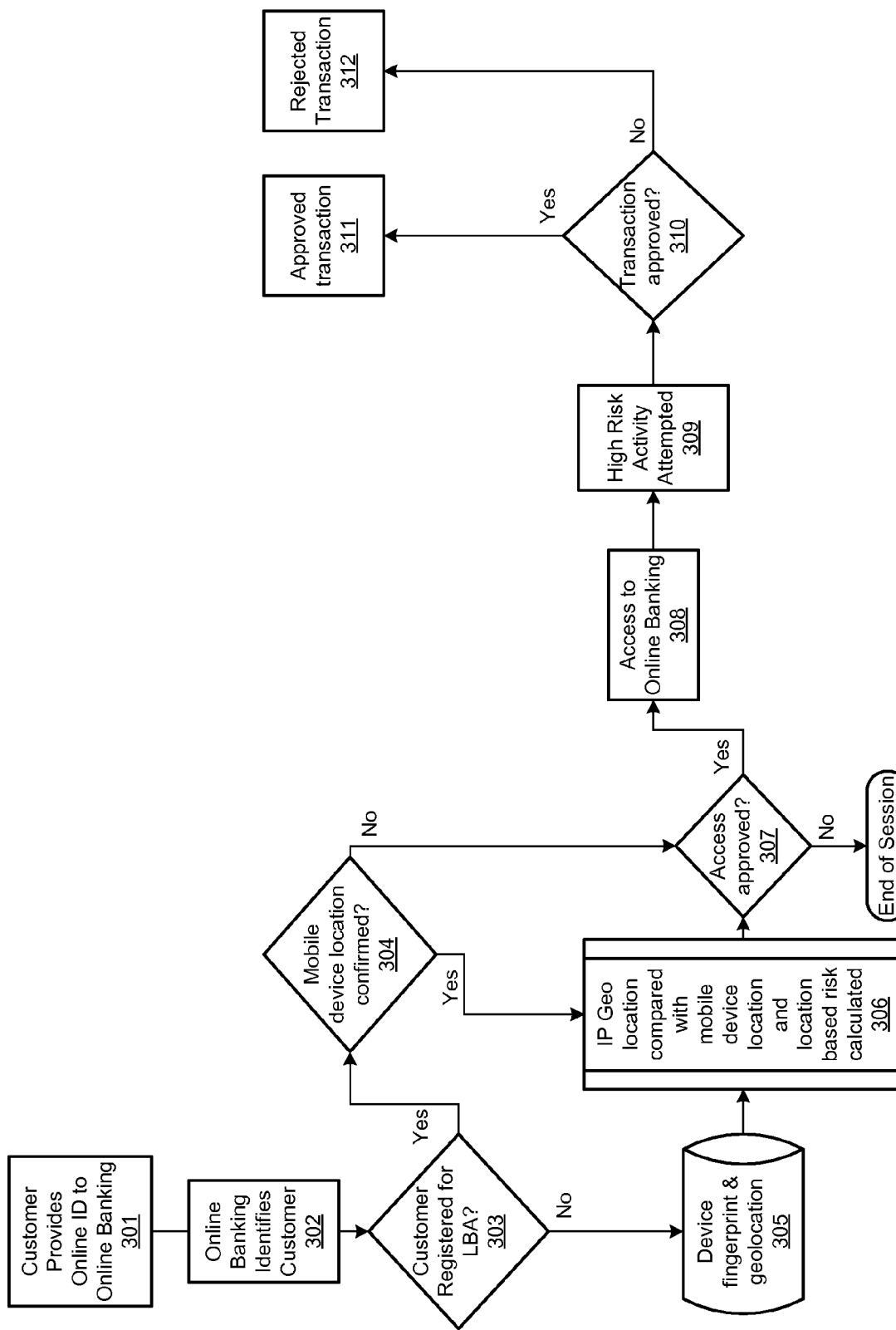
FIG. 3 is a flow chart showing illustrative steps that may be performed to implement location-based authentication for online banking.

In a further illustrative embodiment, bank system 104 may implement the process of FIG. 3, and may additionally implement a multi-use passcode or a one-time passcode (OTP) delivery to a client mobile device associated with the customer. While passcode delivery is known, in this example the delivery of the passcode may be predicated on the determined location of the client mobile device.

For example, the passcode may be delivered to a client mobile device associated with the customer only if that client mobile device is determined to be proximate to client computing device 101 being used by the customer to access the online banking website. Otherwise, the passcode is not delivered to that client mobile device. Typically, the passcode may be delivered by short messaging service (SMS) messaging. Normally, fraud may occur where an unauthorized person has spoofed the targeted client mobile device and thereby fooled the SMS system into forwarding the passcode to the unauthorized person's mobile device. But where location-based authentication is used in connection with passcode delivery, that unauthorized person is unlikely to gain access to the passcode unless the unauthorized person happens to be proximate to client computer 101 used by the authorized customer. This passcode delivery function, including determination of the passcode and determination of whether to deliver the passcode, may be performed by, e.g., access decision engine 201. In addition, the above-described authentication risk score may be affected by whether the passcode has been delivered or whether passcode delivery has been skipped.

Once the passcode has been delivered to the client mobile device, access decision engine 201 waits for that same passcode to be received from client computing device 101, since it would be inputted by the customer into client computing device 101 and sent to the online website. Depending upon whether the passcode as received from client computing device 101 is correct, the authentication risk scoring may be adjusted accordingly and/or further online transaction access may be summarily denied.

In a further illustrative embodiment, financial transactions may be performed directly by client mobile device 102 or 105, without the need for client computing device 101. Even in this situation, location-based authentication may be used to help authentication these transactions. In this mobile banking model, rather than comparing the location of a client mobile device to a client computing device, the location of the client mobile device being used is compared with one or more predetermined locations. These predetermined locations may be fixed, such as a list of certain addresses, cities, states, or countries. Or, the locations may be dynamic and may automatically change over time without customer manual intervention. For example, these predetermined locations may depend upon a history of locations from where the customer has previously implemented online or mobile banking successfully.

Figure 4:
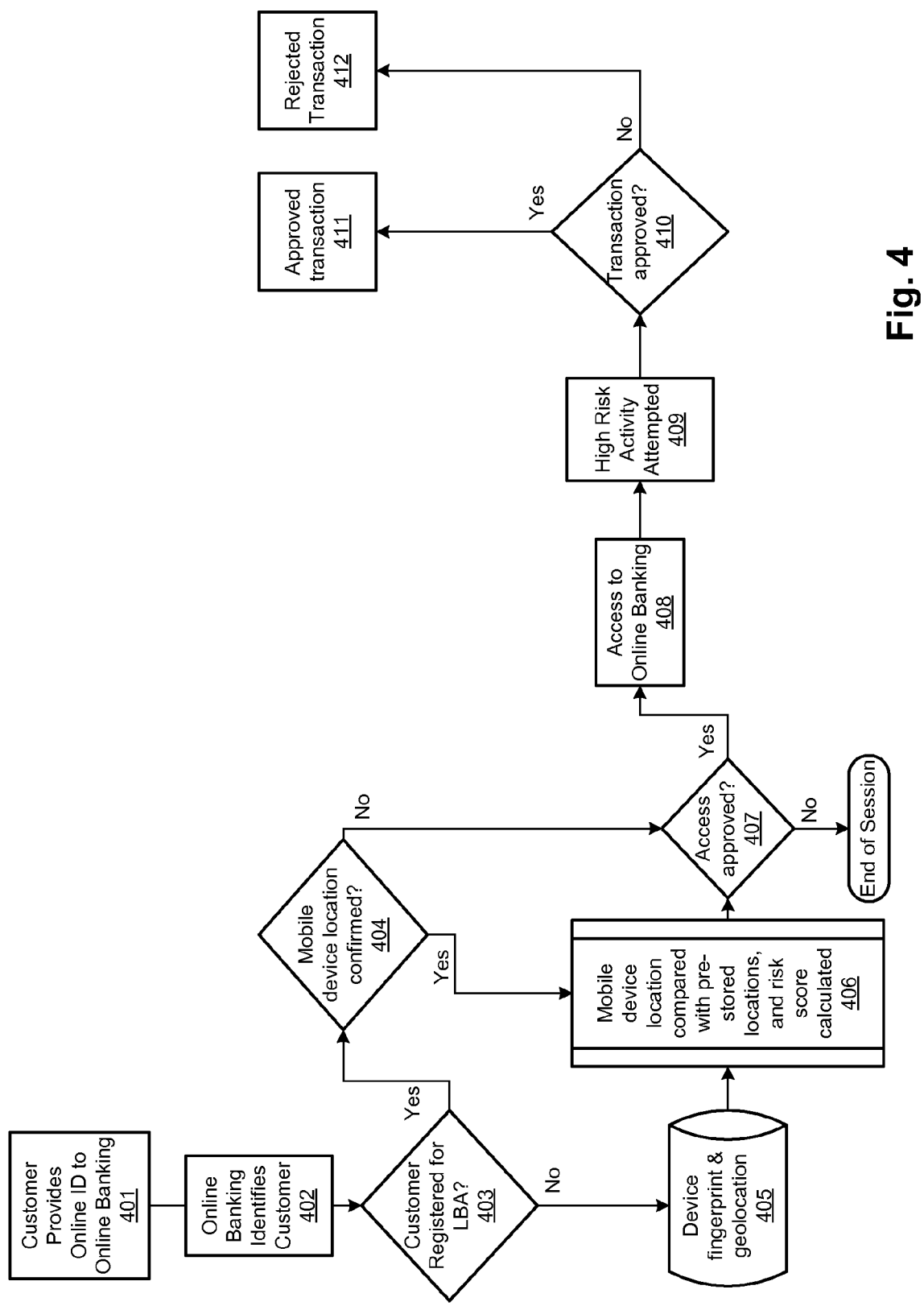
FIG. 4 is a flow chart showing illustrative steps that may be performed to implement location-based authentication for mobile banking.

FIG. 4 is a flow chart showing illustrative steps that may be performed to implement such location-based authentication for mobile banking. Steps 401 to 403 and 405 are identical to steps 301 to 303, except that they are performed where the customer is accessing a mobile banking website from a client mobile device, the mobile banking website being generated for instance by bank system 104. For purposes of explanation, it will be arbitrarily assumed that the customer is using client mobile device 102.

In step 404, if the customer is registered for LBA, then mobile device locator 203 determines the location of client mobile device 102, and returns this location information to access decision engine 201. If client mobile device 102 is located, then the process moves to step 406. If client mobile device 102 is unable to be located, then the process skips step 406 and moves to step 407.

In step 406, access decision engine 201 compares the location of client mobile device 102 with one or more pre-stored locations, and an authentication risk score is determined based on that comparison. The pre-stored locations may, for instance, be a set of locations that, if client mobile device 102 is at one of those locations, would cause the authentication risk score to reflect a higher risk. For example, if client mobile device 102 is in a country or other jurisdiction from which fraud is known to commonly occur, then this may cause the authentication risk score to reflect a high risk.

Alternatively or additionally, the pre-stored locations may be a set of locations that, if client mobile device 102 is at one of those locations, would cause the authentication risk score to reflect a lower risk. An example of such a low-risk location might be the customer's home or place of work, because it is likely that a transaction from those locations is authorized.

Thus, each location in the set of pre-stored locations may have a risk-affecting quality—either risk-lowering or risk-raising. This quality may be associated with each location, either as separate data or inherently by the way that the locations are grouped in storage. The pre-stored location data may be stored, for instance, the above-described database that also stores customer data and information about their associate client mobile devices.

The set of pre-stored locations may be set by the customer and/or by the bank, and may be static or dynamic. For instance, if the customer historically has visited a certain location, then that location may be added to the set of pre-stored locations and associated with a risk-lowering quality.

In step 407, access decision engine 201 determines whether access to mobile banking is approved, based on the authentication risk score. If not approved, then the mobile banking session ends. If approved, then in step 408 access is granted to mobile banking and to mobile transaction functionality, and the mobile customer is passed to transaction decision engine 202.

In step 409, the mobile customer performs a financial transaction, such as a transfer of funds from an account at the bank to an account at another bank, or such as a payment to a payee. If the transaction is of a type that is considered sufficiently high risk (such as the to illustrative transactions just mentioned), then in response transaction decision engine 202 may determine whether the requested transaction is approved in step 410 depending upon the authentication risk score previously determined. If the transaction is approved, then in step 411 this may be noted such as by displaying a first message (e.g., "transaction approved") on the website browsed by client mobile device 102 or by otherwise modifying the mobile banking website in a first way (e.g., by displaying a transaction confirmation or by providing access to another portion of the mobile banking website). If the transaction in rejected, then in step 412 this may be noted such as by displaying a second different message (e.g., transaction rejected") on the website or by otherwise modifying the mobile banking website in a different second way (e.g., by displaying a transaction confirmation or by displaying yet another portion of the mobile banking website). For instance, if the transaction is rejected, the mobile banking website may direct the customer to further authentication functions (such as by asking certain questions that only the customer should know the answer to, or by requiring some other additional authentication).

Thus, various systems, methods, and software have been described for implementing location-based authentication of both online and mobile web-based transactions. While the various examples discussed herein have been directed to a bank providing a banking website and the customer performing financial transactions, the aspects described herein may be used with any type of transactions implemented electronically, such as on any type of web-site.

What is claimed is:

1. A method, comprising:
   determining, by at least one computing device, a first location based on a history of locations visited by a mobile device;
   after determining the first location, determining a location of the mobile device;
   calculating, by the at least one computing device, a risk score depending upon a distance between the location of the mobile device and the determined first location;
   either approving or rejecting a financial transaction requested by the mobile device based on the risk score, such that if the risk score indicates a greater distance, the financial transaction is approved, and if the risk score indicates a smaller distance, the financial transaction is rejected; and sending first data to the mobile device indicating whether the financial transaction is approved or rejected.

2. The method of claim 1, wherein determining the location of the mobile device comprises receiving global positioning system data from the mobile device.

3. The method of claim 1, wherein determining the location of the mobile device comprises determining the location of the mobile device based on a received signal strength of a wireless signal emitted from the mobile device.

4. The method of claim 1, wherein determining the location of the mobile device comprises receiving second data representing the location of the mobile device.

5. The method of claim 1, wherein determining the location of the mobile device comprises:
   sending a request to a cellular communications network, the request identifying the mobile device; and
   receiving an indication of the location of the mobile device.

6. The method of claim 1, wherein the mobile device comprises a cellular telephone.

7. A non-transitory computer-readable medium storing computer-executable instructions for performing a method, the method comprising:
   determining a first location based on a history of locations visited by a first mobile device;
   after determining the first location, determining a location of the first mobile device;
   calculating, by the at least one computing device, a risk score depending upon a distance between the location of the mobile device and the determined first location;
   either approving or rejecting the financial transaction requested by the first mobile device based on the risk score, such that if the risk score indicates a greater distance, the financial transaction is approved, and if the risk score indicates a smaller distance, the financial transaction is rejected.

8. The non-transitory computer-readable medium of claim 7, wherein determining the location of the first mobile device comprises:
   sending a request to a cellular communications network, the request identifying the first mobile device; and
   receiving from the cellular communications network an indication of the location of the first mobile device.

9. The non-transitory computer-readable medium of claim 7, further storing data representing a plurality of mobile devices including the first mobile device and a plurality of locations including the first location, the data being organized such that each of the mobile devices is associated with at least one of the locations.

10. A method, comprising:
    determining a first location based on a history of locations visited by a mobile device;
    after determining the first location, receiving from the mobile device a request for a financial transaction;
    determining a location of the mobile device when the financial transaction is requested;
    comparing the location of the first mobile device with the first location;
    either approving or rejecting the financial transaction depending upon an outcome of the comparison; and calculating a risk score based on the outcome of the comparison, wherein said either approving or rejecting the financial transaction further depends upon the calculated risk score, wherein calculating the risk score comprises calculating the risk score to be higher if the location of the mobile device is determined to be close to the first location, and calculating the risk score to be lower if the location of the mobile device is determined to be farther from the first location, and wherein said either approving or rejecting the financial transaction comprises approving the financial transaction if the risk score is lower and rejecting the financial transaction if the risk score is higher.

11. A method, comprising:
determining, by at least one computing device, a first location;
after determining the first location, determining a location of the mobile device;
comparing, by the at least one computing device, the location of the mobile device with the determined first location;
if the location of the mobile device is less than a particular distance from the first location, then rejecting, by the at least one computing device, a financial transaction request by the mobile device;
if the location of the mobile device is greater than the particular distance from the first location, then approving, by the at least one computing device, the financial transaction request by the mobile device;
sending first data to the mobile device indicating whether the financial transaction is approve or rejected.

12. The method of claim 11, wherein determining the location of the mobile device comprises receiving global positioning system data from the mobile device.

13. The method of claim 11, wherein determining the location of the mobile device comprises determining the location of the mobile device based on a received signal strength of a wireless signal emitted from the mobile device.

14. The method of claim 11, wherein determining the location of the mobile device comprises receiving second data representing the location of the mobile device.

15. The method of claim 11, wherein determining the location of the mobile device comprises:
sending a request to a cellular communications network, the request identifying the mobile device; and
receiving an indication of the location of the mobile device.

16. The method of claim 11, wherein the mobile device comprises a cellular telephone.

17. A non-transitory computer-readable medium storing computer-executable instructions for performing a method, the method comprising:
determining a first location;
after determining the first location, determining a location of the first mobile device;
calculating, by the at least one computing device, a risk score depending upon a distance between the location of the mobile device and the determined first location;
either approving or rejecting the financial transaction requested by the first mobile device based on the risk score, such that if the risk score indicates a greater distance, the financial transaction is approved, and if the risk score indicates a smaller distance, the financial transaction is rejected.

18. The non-transitory computer-readable medium of claim 7, wherein determining the location of the first mobile device comprises:
sending a request to a cellular communications network, the request identifying the first mobile device; and
receiving from the cellular communications network an indication of the location of the first mobile device.

19. The non-transitory computer-readable medium of claim 7, further storing data representing a plurality of mobile devices including the first mobile device and a plurality of locations including the first location, the data being organized such that each of the mobile devices is associated with at least one of the locations.

* * * * *